United States Patent [19]
Ma et al.

[11] Patent Number: 6,152,987
[45] Date of Patent: *Nov. 28, 2000

[54] HYDROGEN GAS-EXTRACTION MODULE AND METHOD OF FABRICATION

[75] Inventors: Yi Hua Ma, Worcester, Mass.; Peter P. Mardilovich, Longmont, Colo.; Ying She, Worcester, Mass.

[73] Assignee: Worcester Polytechnic Institute, Worcester, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 09/139,218

[22] Filed: Aug. 24, 1998

Related U.S. Application Data

[63] Continuation-in-part of application No. 08/991,017, Dec. 15, 1997, abandoned.

[51] Int. Cl.⁷ .................................................. B01D 53/22
[52] U.S. Cl. ..................................... 95/56; 96/11; 55/524; 55/DIG. 5
[58] Field of Search .......................... 95/55, 56; 96/10, 96/11; 55/DIG. 5, 524, 523

[56] References Cited

U.S. PATENT DOCUMENTS

| | | | |
|---|---|---|---|
| 2,958,391 | 11/1960 | de Rosset | 96/11 X |
| 3,241,298 | 3/1966 | Pierce | 96/11 X |
| 3,413,777 | 12/1968 | Langley et al. | 96/11 |
| 3,428,476 | 2/1969 | Langley et al. | 96/11 X |
| 4,496,373 | 1/1985 | Behr et al. | 95/56 X |
| 4,589,891 | 5/1986 | Iniotakis et al. | 55/158 |
| 4,655,797 | 4/1987 | Iniotakis et al. | 96/11 X |
| 4,902,307 | 2/1990 | Gavalas et al. | 55/16 |
| 5,049,167 | 9/1991 | Castro et al. | 55/16 |
| 5,139,541 | 8/1992 | Edlund | 95/56 |
| 5,205,841 | 4/1993 | Vaiman | 55/16 |
| 5,217,506 | 6/1993 | Edlund et al. | 95/56 |
| 5,258,339 | 11/1993 | Ma et al. | 502/4 |
| 5,259,870 | 11/1993 | Edlund | 95/56 |
| 5,393,325 | 2/1995 | Edlund | 95/56 |
| 5,449,848 | 9/1995 | Itoh | 95/56 X |
| 5,498,278 | 3/1996 | Edlund | 95/56 X |
| 5,614,001 | 3/1997 | Kosaka et al. | 95/55 X |
| 5,738,708 | 4/1998 | Peachey et al. | 95/56 |

FOREIGN PATENT DOCUMENTS 4-326931  11/1916  Japan .

OTHER PUBLICATIONS

Edlund, D. J. and McCarthy, J., "The Relationship Between Intermetallic Diffusion and Flux Decline in Composite–Metal Membranes: Implications For Achieving Long Membranes Lifetime," Journal of Membrane Science, vol. 107, No. 1/02, pp. 147–153 (1995).
PATENT ABSTRACT OF JAPAN, vol. 017, No. 400 (C–1089), (JP 05 076738 A, Mar. 30, 1993) (Jul. 27 1993).
PATENT ABSTRACT OF JAPAN, vol. 010, No. 335 (C–384), (JP 61 138516 A, Jun. 26, 1986) ( Nov. 13 1986).
DATABASE WPI, Derwent Publications Ltd., AN 84188007, XP 002097090 (SU 1 058 587 A, Dec. 7, 1983).
DATABASE JAPIO, Japan Patent Information Organization, AN 92–326931 (JP 04–326931, Nov. 16, 1992).

*Primary Examiner*—Robert H. Spitzer
*Attorney, Agent, or Firm*—Hamilton, Brook, Smith & Reynolds, P.C.

[57] ABSTRACT

A hydrogen gas-extraction module includes an intermediate layer bonded between a porous metal substrate and a membrane layer that is selectively permeable to hydrogen. The metal substrate includes a substantial concentration of a first metal at a surface of the metal substrate, and the intermediate layer includes an oxide of this first metal. In one embodiment, where the module is designed to selectively extract hydrogen at high temperatures, the porous metal substrate comprises stainless steel, and the membrane layer includes palladium or a palladium/silver alloy. A method for fabricating a hydrogen gas-extraction membrane includes reacting the porous metal substrate with an oxidizing agent to form a ceramic intermediate layer on a surface of the porous metal substrate and covering the ceramic coating with the membrane layer that is selectively permeable to hydrogen.

30 Claims, 1 Drawing Sheet

HYDROGEN GAS-EXTRACTION MODULE AND METHOD OF FABRICATION

RELATED APPLICATIONS

This application is a continuation-in-part of U.S. Ser. No. 08/991,017 filed Dec. 15, 1997, now abandoned the entire teachings of which are incorporated herein by reference.

BACKGROUND OF THE INVENTION

Gas-separation modules are commonly used to selectively extract a particular gas from a gas mixture. Two of the most common gas-separation modules are polymer membranes and metallic composites. Polymer membranes provide an effective and cost-efficient option for separating a gas at low temperatures. Where separations must be performed in conjunction with high-temperature processing, however, polymer membranes are generally unsuitable because they tend to thermally decompose.

The development of high-temperature processing along with tighter environmental regulations requires utilization of gas-separation modules that provide high fluxes, high selectivity of separation and the ability to operate at elevated temperatures. Instead of polymers, metallic composite modules are widely employed to serve these needs. A composite module consists of a metallic membrane having selective gas-permeability mounted on a porous metallic substrate for support. Alternatively, the module can be a tube formed purely of palladium.

An area of high-temperature gas separation that is of particular interest is the separation and purification of hydrogen gas from a reaction gas mixture. A composite module for selectively separating hydrogen gas at high temperatures includes a palladium (Pd) membrane mounted on a porous metallic substrate. The palladium membrane is permeable to hydrogen but not to other gases. When hydrogen gas ($H_2$) contacts the membrane, the hydrogen molecules dissociate and hydrogen atoms diffuse into the membrane. Accordingly, hydrogen can selectively pass from a surrounding atmosphere through the palladium membrane to the porous substrate. The selectively-extracted hydrogen atoms then reform into $H_2$ gas and pass through the pores of the porous substrate and into a volume on the opposite side of the module.

Nevertheless, the effective life of a typical module having a palladium membrane bonded to a porous metallic substrate often is limited by diffusion of the substrate into the membrane which decreases the permeability of the membrane to hydrogen. The rate of diffusion of the substrate is greatest when the substrate is at or above its "Tamman" temperature. A metal lattice at its Tamman temperature is subjected to considerable thermal (atomic) vibration. If there is an interface between two metals, such thermal vibration significantly increases the mobility of metal atoms and their consequent diffusion. The Tamman temperature of a material is equal to one-half of its melting temperature (in K). Palladium and stainless steel have melting points of 1552° C. (1825 K) and 1375–1400° C. (1648–1673 K), respectively. The corresponding Tamman temperatures are about 640° C. (913 K) and 550–560° C. (823–833 K), respectively. The lower of these temperatures determines the temperature where a significant increase in intermetallic diffusion occurs. Accordingly, at temperatures around 550° C., considerable thermal vibration and diffusion of stainless steel components into the palladium is expected. The alloy created by the diffusion of stainless steel components into the palladium will have reduced hydrogen permeability.

One solution to this problem has been to use a ceramic substrate which will exhibit less diffusion than a purely metallic substrate. Ceramic substrates, however, are typically more brittle than metallic substrates. Further, ceramic substrates are more difficult to fabricate and are also more difficult to join to other components in a gas-separation system.

Gas-separation modules formed purely of palladium have also been used. The elimination of the metallic substrate removes the problem of intermetallic diffusion. However, a monolithic palladium module is very expensive to produce. It must also have a much greater thickness than a composite module to provide the mechanical strength that is desired. This increase in thickness reduces the flux of hydrogen that can be established through the module.

Another approach is to deposit a thermally-stable material on the metallic substrate before applying the selectively-permeable membrane. In U.S. Pat. No. 5,498,278, issued to Edlund, an embodiment is disclosed wherein the thermally-stable material is a woven or non-woven fabric laminated onto the metallic substrate. In another embodiment, disclosed in Gryaznov, et al., *Preparation and Catalysis over Palladium Composite Membranes*, 96 APPL. CATAL. A: GENERAL 15 (1993), an intermediate layer is provided by depositing zirconia, magnesia, tantalum oxide, or tungsten onto the substrate by a magnetron sputtering process. These approaches, however, are complex. Further, the intermediate layer often lacks uniformity, thereby causing the module to be vulnerable to diffusion through gaps in the intermediate layer.

SUMMARY OF THE INVENTION

A hydrogen gas-extraction module according to this invention includes a porous substrate. The substrate possesses a substantial concentration of a first metal at a surface of the porous substrate, and the substrate is bonded to an intermediate layer including the first metal in an oxidized state. Opposite the substrate, the intermediate layer is bonded to a membrane that is selectively permeable to hydrogen.

A method for forming a hydrogen gas-extraction module of this invention includes oxidizing the surface of a porous substrate with an oxidizing agent to form an intermediate ceramic coating. The intermediate coating is then covered with a membrane that is selectively permeable to hydrogen such as palladium or a palladium/silver alloy.

This invention offers the advantages, for example, of providing an intermediate layer that effectively prevents diffusion between the substrate and the membrane that is selectively permeable to hydrogen. In-situ formation of the intermediate layer in accordance with the methods of this invention also can increase the hydrogen permeability of the composite module. Further, by deriving the oxidized intermediate layer from a metallic substrate, the fracture toughness and ductility of the metallic substrate can be retained. As a result, the module can be easily mated with other metallic parts. Further still, the methods for forming the gas-separation module of this invention are economical and relatively simple to perform.

In a particularly preferred embodiment, a porous stainless steel substrate is oxidized and coated with a palladium membrane. A composite palladium/porous stainless steel module, welded from both ends with non-porous stainless steel tubes, can be very easily assembled. Additionally, the thermal expansion coefficient of stainless steel is almost identical to that of palladium, ensuring desirable mechanical properties of the composite module during temperature cycling.

DESCRIPTION OF PREFERRED EMBODIMENTS

The features and other details of the method of the invention will now be more particularly described with reference to the accompanying drawings and pointed out in the claims. Numbers that appear in more than one figure represent the same item. It will be understood that the particular embodiments of the invention are shown by way of illustration and not as limitations of the invention. The principal features of this invention can be employed in various embodiments without departing from the scope of the invention.

Figure 1:
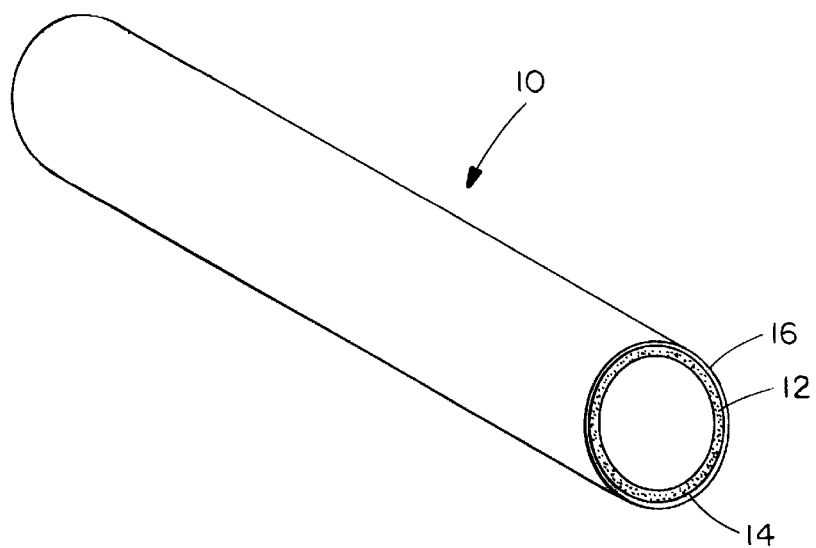
FIG. 1 is a sectional perspective view of an embodiment of a composite gas-separation module of this invention.

FIG. 1 illustrates one embodiment of a cylindrical hydrogen gas-extraction module 10 of the invention. Module 10 includes porous metal substrate 12, intermediate layer 14 and membrane 16 that is selectively permeable to hydrogen.

As an alternative to the illustrated embodiment, the oxidized intermediate layer may be on the interior surface of the substrate, with the membrane forming the innermost of the three cylindrical layers. In other alternative embodiments, the module can take any of a variety of forms, such as a porous flat plate.

In one embodiment, substrate 12 has a thickness of 1.6 millimeters, or 1/16th of an inch, and a porosity in a range of 15 to 50% with pore sizes in a range of 0.2 to 0.5 micrometers. A smaller pore size is preferred, though the size of pores in substrate 12 in some embodiments is 1 or 2 micrometers or even as great as 5 micrometers or more. Preferably, substrate 12 is formed of porous stainless steel. Cylinders of porous stainless steel that are suitable for use as substrates are available from Mott Metallurgical Corp. (Farmington, Conn.), for example. Alternatively, substrate 12 can be formed of any of a number of other porous materials, such as iron, nickel, titanium, chromium and aluminum, as well as alloys of any of these metals. Serving primarily as a support structure, substrate 12 enhances the durability and strength of the module.

Oxidized intermediate layer 14 is a ceramic material formed when a metal of substrate 12 is oxidized in an oxidation-reduction reaction with, for example, oxygen, nitrogen or carbon. As used herein, the term, "oxidize," refers to the process of taking an electron away from a reducing agent in an oxidation-reduction reaction. The concentration of the metal that is to be oxidized at the surface of the substrate must be substantial.

The term, "substantial," is used to designate a concentration that is sufficient to provide a diffusion-resistant coating across the surface of substrate 12 when oxidized. Typically, the metal that is oxidized is present in a substantial concentration throughout substrate 12, as is iron in steel, for example. In which case, the molar concentration of the metal that is to be oxidized is preferably more than half. Although other oxidizable metals are found in steel, most are present in very small or trace amounts, i.e., a few percent or less. These concentrations are generally considered insubstantial.

However, the concentration of an easily-diffused element such as aluminum, though present in a concentration of perhaps 4% of entire substrate 12, can be made "substantial" by heating substrate 12 to a temperature around 1000° C. to 1050° C. The temperature, however, should not be driven so high as to collapse the pores of the porous substrate. At this temperature, the aluminum diffuses to the surface of the steel substrate, creating a disproportionately high aluminum concentration at the surface despite the relatively low concentration of aluminum in the substrate as a whole. If, under these circumstances, the aluminum that has diffused to the surface can be oxidized to form a diffusion-resistant aluminum oxide coating, then the concentration of aluminum at the surface is "substantial."

In an alternative embodiment, a metal to be oxidized is deposited on the surface of a porous foundation to form substrate 12. Preferably, the porous foundation is stainless steel. The metal is deposited by deep-coating a metal powder with binder on the porous foundation or by any conventional method. Metals suitable for deposition include tantalum, niobium, vanadium, aluminum, and other metals that can be easily oxidized in air. The deposited layer is then oxidized as in the other embodiments with the temperature controlled to provide an intermediate layer 14 of desired thickness. Note that tantalum, vanadium and niobium are extremely unstable in air and will rapidly oxidize in such an environment.

Among different embodiments, the thickness of intermediate layer 14 can vary from a few micrometers to tens of micrometers. Intermediate layer 14 is coated by a membrane 16 that is selectively permeable to hydrogen. In one embodiment, membrane 16 has a thickness of about 18 to 32 micrometers and is selectively permeable to at least one gas but not to others. A membrane 16 of palladium or certain of its alloys, for example, allows diffusion of hydrogen gas through the membrane while posing a nearly impermeable barrier to other gases. Therefore, membranes comprising palladium or its alloys are particularly desirable for selectively extracting hydrogen. Where module 10 is to be used at temperatures less than 300° C., membrane 16 is preferably formed of a palladium alloy, such as an alloy of 75 to 77% palladium and 23 to 25% silver. An alloy is preferred at low temperatures because pure palladium undergoes a phase change in the presence of hydrogen around 250° C., and this phase change will lead to embrittlement of the membrane after repeated cycling. In one embodiment, the palladium/silver alloy is formed by first depositing palladium onto substrate 12 by electroless deposition and then depositing silver, also by electroless deposition. An alloy membrane layer 16 is then formed by heating the silver and palladium layers to 300 to 1000° C. in an inert or hydrogen atmosphere. Examples of other metals suitable for selectively extracting hydrogen include nickel, platinum, vanadium, niobium, tantalum, metals in Groups III–V, etc.

In a preferred fabrication method of the invention, any contaminants are initially cleaned from substrate 12 by placing substrate 12 in an ultrasonic bath with alkaline solution. For example, substrate 12 can be ultrasonically soaked for half an hour with the temperature of the bath at about 60° C. Cleaning can then be followed by rinsing, wherein substrate 12 is sequentially rinsed in tap water, deionized water and isopropanol.

Substrate 12 is then oxidized at an elevated temperature in a furnace to form intermediate layer 14. The presence of intermediate layer 14 inhibits intermetallic diffusion between metallic substrate 12 and palladium membrane 16, thereby protecting the integrity of palladium membrane 16 and extending its effective life.

To form an oxide intermediate layer, substrate 12 can be oxidized in air or pure oxygen. The temperature at which substrate 12 is oxidized depends on the metal or the composition of the alloy of which substrate 12 is comprised. Where membrane 16 is to be placed on the outer surface of the module, oxidation is confined primarily to the outer surface of substrate 12. In one embodiment of the method, confinement of oxidation is promoted by sealing the interior surface of substrate 12 or by passing an inert gas through the interior of substrate 12. Alternatively, where membrane 16 is to be placed on the inner surface of the module, oxidation is confined primarily to the inner surface of substrate 12. The rate and depth of oxidation depend on the composition of the alloy and temperature. Contamination of the atmosphere with water and carbon dioxide ($CO_2$) often increases oxidation (corrosion) of stainless steel at elevated temperatures.

For example, iron in stainless steel oxidizes at temperatures below 570° C. to form $Fe_3O_4$ and $Fe_2O_3$. Above 570° C., the iron oxidizes to form FeO, $Fe_3O_4$ and $Fe_2O_3$. In the presence of chromium, the efficiency of oxidation decreases significantly. Steels with a high concentration of chromium exhibit negligible oxidation rates in air at temperatures up to 700° C. Preferably, a stainless steel substrate is suitably oxidized by heating it to 900° C. in air or in an atmosphere of nitrogen or oxygen. Oxidation continues under these conditions for about 4 hours. Due to interaction between substrate 12 and the oxidizing gas, a substantially-uniform ceramic coating of, for example, iron oxide or iron nitride is formed, in situ, on the surface of substrate 12.

In an alternative embodiment, a nitride intermediate layer is used. A suitable nitride intermediate layer can be formed on substrate 12 by oxidizing substrate 12 in an ammonia-bearing or nitrogen-based atmosphere. Substrate 12 is exposed to a gas mixture wherein ammonia ($NH_3$) is present in a concentration as low as just a few percent. The nitride layer forms at a temperature in the range of 500 to 1000° C. The required exposure time and the depth of the nitride layer depend on the composition of the substrate, temperature, ammonia concentration (if any), and composition of the nitride-forming gas.

In yet another alternative embodiment, a carbide intermediate layer is formed on substrate 12 by oxidizing substrate 12 in an atmosphere including carbon monoxide (CO), methane ($CH_4$) or other hydrocarbon gases at elevated temperatures. The carbide-forming process is typically carried out at temperatures of 840 to 930° C.

To enhance the stability of module 10, particularly where it will be used at high temperatures, intermediate layer 14 can further include a coating of a second protective layer, such as a layer of alumina, silica, mullite, cordierite, zirconia, titania, tantalum oxide, tungsten or magnesium oxide, applied by a suitable method.

Following the formation of intermediate layer 14, the outer surface of intermediate layer 14 is activated. The purpose of surface activation is to seed intermediate layer 14 with nuclei of the metal that forms the membrane. In this embodiment, that metal is palladium. When the membrane is subsequently applied to the intermediate layer 14 by electroless plating, the palladium nuclei on the surface of intermediate layer 14 initiate an autocatalytic process of reducing a metastable palladium salt complex on intermediate layer 14.

Substrate 12 and intermediate layer 14 together form a tubular support 22 (shown in FIG. 2) for the membrane. In one embodiment, support 22 is alternately immersed in $SnCl_2$ and $PdCl_2$ baths. Support 22 is first immersed for about five minutes in an acidic $SnCl_2$ bath to sensitize support 22. Then, support 22 is immersed for a period in a range of between about three and about five minutes in an acidic $PdCl_2$ bath to seed support 22 with palladium nuclei. The temperature of each bath is 20° C. After each immersion in the $SnCl_2$ bath, support 22 is gently rinsed with deionized water. After each immersion in the $PdCl_2$ bath, support 22 is rinsed first with 0.01 molar hydrochloric acid (HCl) and then with water. The 0.01 M HCl is used to prevent hydrolysis of $Pd^{2+}$ ions.

During rinsing with deionized water after immersion of support 22 in the acidic $SnCl_2$ bath, $Sn^{2+}$ ions on the surface of support 22 are partially hydrolyzed to form a relatively-insoluble product ($Sn(OH)_{1.5}Cl_{0.5}$ and other more complicated hydroxyl-chlorides). The products of hydrolysis are strongly attached to the surface as a layer having a thickness on the order of a few angstroms. The composition, structure, and thickness of this layer depend on factors such as the ratio of HCl to $SnCl_2$, the structure, roughness and shape of the support surface, and the hydrodynamic regime of rinsing.

Generally, the two-step immersion sequence in $SnCl_2$ and $PdCl_2$ solutions is repeated between about two and about ten times, preferably between about two and five times, depending on the intensity of the activation. In a particularly preferred embodiment, the activated layer has a uniform dark-brown color and smooth surface.

The activation layer has a structure comprising a number of thin layers, each formed after a sensitizing/activation cycle, of palladium nuclei. These preseeded palladium nuclei reduce the induction period of the autocatalytic process at the start of the electroless plating of palladium.

Alternatively, the palladium membrane can be deposited without the surface activation procedure described above. Absent activation, however, the nucleation process is very slow and the induction period is extended. As a result, plating is slow. In either case, the growth rate of the palladium membrane accelerates due to autocatalytic deposition after the content of the deposited palladium reaches about 0.1 mg/cm$^2$.

Palladium deposition occurs according to the following autocatalytic reaction:

or

Figure 2:
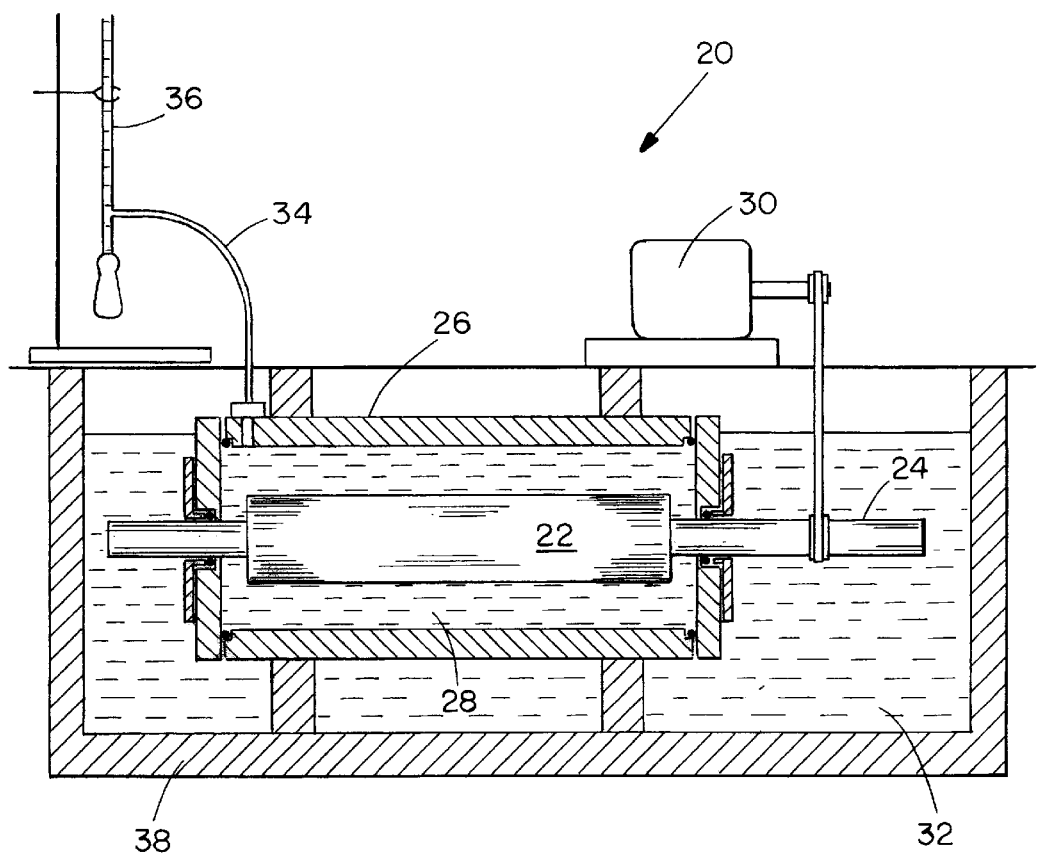
FIG. 2 is a view, partially schematic and partially in cross-section, of an apparatus for electroless plating a membrane on a support by the method of this invention.

Apparatus 20, illustrated in FIG. 2, is used for electroless plating of palladium. The composition of solution 28 used for electroless plating is preferably as follows:

| | |
|---|---|
| $Pd(NH_3)_4Cl_2 \cdot H_2O$, g/l | 4.0 |
| $NH_4OH$(28%), ml/l | 198 |
| $Na_2EDTA$, g/l | 40.1 |
| $H_2NNH_2$(1 M), ml/l | 5.6–7.6 |

Preferably, this bath is maintained at a temperature of about 60° C. The bath typically has a pH of approximately 10.4 and is provided in a quantity sufficient to provide approximately 3.5 cm$^3$ of solution per square centimeter of plating area.

Activated tubular support 22, comprising the activated intermediate layer 14 coated on a porous metal substrate 12, is mounted on nonporous stainless steel tube 24 in plating cell 26. Plating cell 26 is filled with electroless plating solution 28. Controlled axial rotation of tube 24 by motor 30 promotes uniform deposition of palladium upon support 22. Temperature control of the bath is provided by immersing plating cell 26 in water jacket 32 within surrounding vessel 38. As palladium is deposited on support 22, gaseous reaction products evolve. The main component of the gaseous products is nitrogen. The gaseous products are removed from plating cell 26 through outlet tube 34 into soap-bubble flow meter 36. Soap-bubble flow meter 36 provides a quantitative measurement of the flow of gases evolved from the reaction.

After about one hour of steady-state deposition of palladium onto support 22, the plating activity decreases with the depletion of palladium ions and hydrazine ($H_2NNH_2$) and the decrease in the pH of plating solution 28. After depletion of plating solution 28, a new solution is provided, and the procedure is repeated. A stable high rate of deposition for each plating is achieved not only by changing plating solution 28, but also by carefully rinsing the membrane between platings. Typically, the membrane is rinsed a minimum of five times with deionized water at 50 to 60° C. for 2 to 5 minutes. As alternatives to electroless plating, palladium can be deposited on support 22 by other suitable techniques, such as electroplating, spray deposition, vacuum sputtering, etc. The thus-formed palladium membrane covers the intermediate layer and seals the pores at the surface of support 22.

An increase in the flux of hydrogen through the module also can be achieved by decreasing the thickness of the palladium layer and increasing the porosity of support 22. To deposit a thinner layer of palladium, the pore size of support 22 is smaller or is decreased prior to palladium deposition.

When the completed module is surrounded with a hydrogen-containing atmosphere, the palladium membrane causes the hydrogen gas to dissociate and dissolve through the membrane as an element. As a result, hydrogen is selectively removed from the surrounding atmosphere into the volume within the cylinder. A pressure gradient, wherein pressure within the cylinder is less than that surrounding the cylinder, can be maintained to increase the flux of hydrogen through the module.

Specific applications for which the module is well-suited include hydrogenation/dehydrogenation reactions and methane/steam reforming reactions. In dehydrogenation reactions, the reaction products include hydrogen gas. Reactants, at least one of which includes molecularly-bound hydrogen, are placed between or within modules of this invention. As the reaction proceeds, hydrogen gas is removed by the module from the volume wherein the reactants react. The reaction is equilibrium controlled. Accordingly, the reaction is limited by the accumulation of hydrogen gas, wherein the reaction reaches equilibrium when a sufficient quantity of hydrogen has accumulated. When hydrogen is separated from the reactants, however, the reaction is driven to completion. In a methane/steam reformation, methane and steam are passed through or around a tubular module of this invention in the presence of a catalyst. The methane and steam react to produce carbon monoxide and hydrogen, and the hydrogen is dissociated into the membrane and thereby separated from the other gases.

The invention now will be further and more fully described by the following examples.

EXEMPLIFICATION

Example 1

An asymmetric composite palladium/porous stainless steel module was prepared as follows.

A porous 316L stainless steel cup was electrically welded to a non-porous stainless steel tube. The cup had an outside diameter of 12.7 mm or ½ inch, a wall thickness of 1.6 mm or 1/16 inch, and a length of 25 mm or 1 inch. Contaminants were removed by cleaning the cup in an ultrasonic bath with alkaline solution at 60° C. for a half hour. This cleaning procedure was followed by sequentially rinsing the cup in tap water, deionized water and isopropanol.

The cup was then oxidized with oxygen at 900° C. for 4 hours. The rate of heating and cooling was 3° C./min.

Next, the oxidized cup was surface activated by immersing the cup in baths of $SnCl_2$ and $PdCl_2$, as described previously in this specification. The immersion treatments were repeated 5 times, and the activated cup was then dried for 2 hours at 120° C.

Following the surface activation, palladium was deposited on the activated cup by electroless plating according to the following procedure. Each activated cup was immersed in a plating solution at room temperature. The plating solution had the following composition: 4 g/l $Pd(NH_3)_4Cl_2.H_2O$, 198 ml/l $NH_4OH$ (28%), 40.1 g/l $Na_2EDTA$, and 6 ml/l $H_2NNH_2$ (1 M). The plating solution and cup were then placed in a water bath at 60° C. This plating procedure was repeated 14 times. The total time of plating was 25 hours, and the thickness of the palladium layer was 32.5 μm.

Hydrogen permeation measurements of the prepared module were carried out in a chamber wherein a controlled flow of pure hydrogen gas served as a feed gas. The feed gas flowed through the chamber and across the surface of the oxidized cup. Hydrogen gas was selectively extracted from the surrounding gas through the cup and into the stainless steel tube welded to the cup. The permeant hydrogen gas was then measured as a volumetric flow rate as it flowed through the tube.

Example 2

The procedure as in Example 1 was carried out with the following exceptions. Oxidation of the cup was performed at 600° C. for 4 hours. The palladium deposition procedure was repeated 12 times. The total time of plating was 18 hours. Finally, the thickness of the palladium layer was 25.4 μm.

Example 3

The procedure as in Example 1 was carried out with the following exceptions. Oxidation of the cup was performed at 800° C. for 4 hours. The palladium deposition procedure was repeated 16 times. The total time of plating was 24 hours. Finally, the thickness of the palladium layer was 30.2 μm.

Example 4

The procedure as in Example 1 was carried out with the following exceptions. The cup was oxidized with nitrogen rather than oxygen. The nitriding of the cup was performed at 980° C. for 20 hours in an equal mixture of nitrogen and hydrogen. The palladium deposition procedure was repeated 12 times. The total time of plating was 20 hours. Finally, the thickness of the palladium layer was 26.1 μm.

Example 5

The procedure as in Example 1 was carried out with the following exceptions. No preliminary treatment of the cup was performed except gentle brushing of the porous stainless steel. The cup was not oxidized. The palladium deposition procedure was repeated 9 times. The total time of plating was 14 hours. Finally, the thickness of the palladium layer was 18.6 μm.

Hydrogen permeation data from each of Examples 1–5 is presented in the table, below.

| Duration of the exposure at 350° C. | Hydrogen permeability, $m^3 \cdot \mu m/(m^2 \cdot h \cdot atm^{0.5})$ | | | | |
| --- | --- | --- | --- | --- | --- |
| | Example 1 | Example 2 | Example 3 | Example 4 | Example 5 |
| 1 h | 160.2 | 194.2 | 120.2 | 151.7 | 73.4 |
| 100 h | 209.7 | 228.7 | 148.8 | 179.1 | 54.8 |
| 500 h | 208.1 | — | — | — | 38.0 |
| 1000 h | 208.6 | — | — | — | — |
| 4000 h | 172.5 | — | — | — | — |

Comparing Examples 1–4 with Example 5, the oxidized cups (1–4) demonstrated, over time, a permeability to hydrogen significantly greater than that of the nonoxidized cup (5). Furthermore, all cups having an intermediate layer, formed by in-situ oxidation demonstrated long-term stability at 350° C. The cup described in Example 1, for example, showed little decline in its hydrogen flux rate after more than 4,000 hours. In addition, the oxidized cups showed an increase in hydrogen flux of about 20% during the first 100 hours. The basis for this increase is unclear. However, it is suspected that the increase is due to a rearrangement of the microstructure of the intermediate layer. In contrast, the membrane prepared without such a layer showed a 25% decrease in hydrogen flux during the first 100 hours.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

We claim:

1. A method for selectively separating hydrogen from hydrogen-producing reactants comprising the following steps:
   a) reacting the hydrogen-producing reactants to produce hydrogen;
   b) separating the hydrogen from the hydrogen-producing reactants with a composite gas-separation module having:
      1) a porous metal substrate including a substantial concentration of a first metal at a surface of the porous metal substrate;
      2) an intermediate layer bonded to the porous metal substrate, wherein the intermediate layer includes the first metal in an oxidized state; and
      3) a membrane that is selectively permeable to hydrogen, wherein the membrane is bonded to the intermediate layer.

2. A composite gas-separation module comprising:
   a) a porous substrate including a substantial concentration of a first metal at a surface of the porous metal substrate;
   b) an intermediate layer bonded to the porous substrate, wherein the intermediate layer includes the first metal in an oxidized state; and
   c) a membrane that is selectively permeable to hydrogen, wherein the membrane is bonded to the intermediate layer.

3. The module of claim 2, wherein the intermediate layer includes a compound selected from the group consisting of an oxide of the first metal, a nitride of the first metal, and a carbide of the first metal.

4. The module of claim 2, wherein the membrane includes palladium.

5. The module of claim 2, wherein the membrane includes an alloy.

6. The module of claim 5, wherein the membrane includes an alloy of palladium and silver.

7. The module of claim 2, wherein the membrane includes at least one element or alloy of elements selected from the group consisting of nickel, platinum, vanadium, niobium, tantalum and metals in Groups III–V.

8. The module of claim 2, wherein the porous substrate includes a metal selected from the group consisting of iron, nickel, titanium, chromium, aluminum and alloys of any of the preceding metals.

9. The module of claim 2, wherein the porous substrate includes stainless steel.

10. The module of claim 2, wherein the intermediate layer includes an oxide of the first metal.

11. The module of claim 2, wherein the intermediate layer includes iron oxide.

12. The module of claim 2, wherein the intermediate layer includes a nitride of the first metal.

13. The module of claim 2, wherein the intermediate layer includes a carbide of the first metal.

14. The module of claim 2, wherein the intermediate layer further includes a second coating including a material selected from the group consisting of alumina, silica, mullite, cordierite, zirconia, titania, tantalum oxide, tungsten and magnesium oxide.

15. A composite gas-separation module comprising:
    a) a porous stainless steel substrate layer;
    b) a membrane layer including palladium; and
    c) an intermediate layer of a ceramic selected from the group consisting essentially of iron oxide, iron nitride, iron carbide, and aluminum oxide wherein the intermediate layer is bonded to and between the porous stainless steel substrate layer and the membrane layer.

16. The composite gas-separation module of claim 15, wherein the membrane layer includes a palladium/silver alloy.

17. A method for fabricating a composite gas-separation module comprising the following steps:
    a) reacting a metal of a porous substrate with an oxidizing agent to form a ceramic coating on a surface of the porous substrate; and
    b) covering the ceramic coating with a metal membrane layer that is selectively permeable to hydrogen.

18. The method of claim 17, wherein the ceramic coating is covered with a metal alloy membrane layer that is selectively permeable to hydrogen.

19. The method of claim 17, wherein the ceramic coating is covered with a selectively-permeable metal membrane layer that includes palladium.

20. The method of claim 17, wherein the ceramic coating is covered with a selectively-permeable metal membrane layer that includes a palladium/silver alloy.

21. The method of claim 17, wherein the step of reacting the porous substrate includes exposing the substrate to oxygen.

22. The method of claim 17, wherein the porous substrate is reacted with an oxidizing agent including nitrogen.

23. The method of claim 17, wherein the porous substrate is reacted with an oxidizing agent including carbon.

24. The method of claim 17, wherein a porous substrate including a metal selected from the group consisting of iron, nickel, titanium, aluminum and alloys of any of the preceding metals is reacted with the oxidizing agent.

25. The method of claim 17, wherein a porous stainless steel substrate is reacted with the oxidizing agent.

26. The method of claim 17, further comprising the step of placing a second protective layer between the ceramic coating and the selectively-permeable metal membrane layer.

27. The method of claim 17, further comprising the step of depositing the metal that will be reacted to form the ceramic coating onto a porous foundation to form the porous substrate.

28. The method of claim 27, wherein the deposited metal is selected from the group consisting of tantalum, niobium, vanadium, and aluminum.

29. A method for fabricating a composite gas-separation module comprising the following steps:

a) surrounding a porous stainless steel substrate with an oxidizing atmosphere heated to a temperature of at least about 500° C., allowing a surface of the porous stainless steel substrate to be oxidized forming an intermediate layer; and, subsequently, b) applying a membrane including palladium onto the intermediate layer.

30. The method of claim 29, wherein a membrane including a palladium/silver alloy is applied onto the intermediate layer.

* * * * *